United States Patent
Harmsen et al.

(10) Patent No.: US 10,738,672 B2
(45) Date of Patent: Aug. 11, 2020

(54) METHODS AND SYSTEMS FOR CATALYST HEATING

(71) Applicant: Ford Global Technologies, LLC, Dearborn, MI (US)

(72) Inventors: Jan Harmsen, Simpelveld (NL); Joerg Kemmerling, Monschau (DE)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 16/255,704

(22) Filed: Jan. 23, 2019

(65) Prior Publication Data

US 2019/0234272 A1    Aug. 1, 2019

(30) Foreign Application Priority Data

Jan. 29, 2018    (DE) .................. 10 2018 201 278

(51) Int. Cl.
*F01N 3/20* (2006.01)
*F01N 9/00* (2006.01)
(Continued)

(52) U.S. Cl.
CPC .............. *F01N 3/2013* (2013.01); *B60K 6/24* (2013.01); *F01N 5/04* (2013.01); *F01N 9/00* (2013.01); *F02B 37/04* (2013.01); *F02B 37/14* (2013.01); *F02B 39/10* (2013.01); *F02M 26/04* (2016.02); *B60Y 2200/92* (2013.01); (Continued)

(58) Field of Classification Search
CPC ..... B60K 6/24; B60Y 2200/92; F01N 13/009; F01N 2240/16; F01N 2340/06; F01N 2900/0602; F01N 2900/08; F01N 2900/104; F01N 2900/1602; F01N 3/2013;
(Continued)

(56) References Cited

U.S. PATENT DOCUMENTS 8,191,354 B2    6/2012    Cavataio et al.
8,437,898 B2 *  5/2013    Hashimoto ............ B60K 6/445
                                                  701/22
(Continued)

FOREIGN PATENT DOCUMENTS

CN    104500198 A    4/2015
DE      4139291 A1   6/1993
WO   2018004386 A1   1/2018

OTHER PUBLICATIONS

Pfahl, U. et al., "Advanced Exhaust Gas Thermal Management for Lowest Tailpipe Emissions—Combining Low Emission Engine and Electrically Heated Catalyst," Abstract of SAE Technical Paper 2012-01-1090, Proceedings of the 2012 SAE World Congress and Exhibition, Detroit, Michigan, Apr. 26, 2012, Available Online Apr. 16, 2012, 1 page.

*Primary Examiner* — Jesse S Bogue (74) *Attorney, Agent, or Firm* — Geoffrey Brumbaugh; McCoy Russell LLP (57) ABSTRACT

Methods and systems are provided for a motor vehicle engine, a supply air system including an electrically heated exhaust gas aftertreatment device arranged in the exhaust system, an electric turbocharger including an exhaust turbine and an intake compressor. In one example, the exhaust gas aftertreatment device may be heated and the electric turbocharger may be simultaneously operated to expedite attainment of aftertreatment device light-off while maintaining emissions quality.

18 Claims, 5 Drawing Sheets

(51) Int. Cl.
*F01N 5/04* (2006.01)
*F02M 26/04* (2016.01)
*B60K 6/24* (2007.10)
*F02B 37/04* (2006.01)
*F02B 37/14* (2006.01)
*F02B 39/10* (2006.01)
*F01N 13/00* (2010.01)

(52) U.S. Cl.
CPC ........ *F01N 13/009* (2014.06); *F01N 2240/16* (2013.01); *F01N 2340/06* (2013.01); *F01N 2900/0602* (2013.01); *F01N 2900/08* (2013.01); *F01N 2900/104* (2013.01); *F01N 2900/1602* (2013.01)

(58) Field of Classification Search
CPC .... F01N 5/04; F01N 9/00; F02B 37/04; F02B 37/14; F02B 39/10; F02M 26/04
See application file for complete search history.

(56) References Cited

U.S. PATENT DOCUMENTS

| | | | |
|---|---|---|---|
| 8,516,806 B2* | 8/2013 | Sujan | B60W 10/06 |
| | | | 60/297 |
| 8,756,917 B2 | 6/2014 | Gonze et al. | |
| 9,469,291 B2* | 10/2016 | Okamoto | B60W 10/30 |
| 9,951,673 B2* | 4/2018 | Qi | F01N 3/0234 |
| 10,301,991 B1* | 5/2019 | Dudar | F02M 25/0872 |
| 10,473,011 B2* | 11/2019 | Kurtz | F02D 41/18 |
| 2011/0107739 A1 | 5/2011 | Shimizu et al. | |
| 2015/0083092 A1 | 3/2015 | Desai | |
| 2019/0040803 A1* | 2/2019 | Hillen | F02D 13/06 |
| 2019/0242316 A1* | 8/2019 | Dudar | F02D 41/0007 |
| 2019/0353108 A1* | 11/2019 | Han | F02D 41/005 |

* cited by examiner

METHODS AND SYSTEMS FOR CATALYST HEATING

CROSS REFERENCE TO RELATED APPLICATION

The present application claims priority to German patent application No. 102018201278.4, filed on Jan. 29, 2018. The entire contents of the above-listed application are hereby incorporated by reference for all purposes.

FIELD

This disclosure relates generally to method and systems for operating an electric turbocharger and an electrically heated exhaust catalyst for NOx reduction.

BACKGROUND/SUMMARY

The present disclosure relates to a motor vehicle having an internal combustion engine, an exhaust system, a turbine of a turbocharger arranged in the exhaust system and an exhaust gas aftertreatment device arranged in the exhaust system downstream of the turbine. Furthermore, the present disclosure relates to an operating method for operating the motor vehicle.

Vehicles may be equipped with various exhaust aftertreatment devices to reduce the release of exhaust emissions into the atmosphere. For example, three-way catalysts may reduce levels of various emissions including carbon monoxide and unburnt hydrocarbons while selective catalyst reduction (SCR) systems may be used to reduce levels of NOx. The exhaust catalyst may be effective in exhaust gas treatment above a catalyst light-off temperature.

DE 4139291 A1 shows a method for operating an internal combustion engine with exhaust gas turbocharging, in the case of which the exhaust gas turbine is subjected, at least at times, to additional fuel and/or combustion air supply with an elevated exhaust gas mass flow for achieving a detoxification of the exhaust gas and a rapid run-up of the exhaust gas turbine, the exhaust gas being catalytically ignited upstream of the turbine. A device for carrying out the method comprises an electrically heated catalytic converter, which is arranged parallel to a first exhaust gas line upstream of the exhaust gas turbine and which can be subjected to the exhaust gas flow at times by means of a shut-off valve.

CN 104500198 A discloses an electrically controlled exhaust system for a supercharged engine. The system comprises a compressor, a catalytic converter, an exhaust manifold and an exhaust bypass valve. A bypass valve control uses an electrically controlled actuator. The electrically controlled actuator is connected to an electrical control unit. A first branch-off pipe is in connection with a fourth branch-off pipe. A second branch-off pipe is in connection with a third branch-off pipe. Two paths of independent exhaust ports are formed at the outlet end of the exhaust manifold. The outlet end of the exhaust manifold is connected to an exhaust inlet of the compressor. The catalytic converter is connected to an exhaust gas outlet of the compressor in a closed coupling manner. This configuration is to realize a rapid discharge of exhaust gases and a shortened exhaust gas path.

However, the inventors herein have recognized potential issues with such systems. Operation of an exhaust turbine such as an electric turbine may increase the exhaust air fuel ratio (AFR), thereby causing reduction in exhaust NOx levels. However, during conditions when the temperature of the exhaust catalyst is lower than the light-off temperature, increase in exhaust AFR caused by electric turbine operation may further decrease exhaust temperature, thereby prolonging exhaust catalyst heating period. During the catalyst heating period (catalyst temperature below the light-off temperature), emissions quality may be adversely affected due to lower NOx conversion efficiency of the catalyst.

The present disclosure is based on the object of providing a motor vehicle and an operating method with which an improved exhaust gas aftertreatment can be achieved. In one example, the issues described above may be at least partly addressed by a system for a motor vehicle comprising: an internal combustion engine, a supply air system, an exhaust system, an exhaust gas aftertreatment device arranged in the exhaust system, a turbocharger including a turbine arranged in the exhaust system upstream of the exhaust gas aftertreatment device and a compressor arranged in the supply air system, an electric machine designed to drive the turbine or the compressor, and a heater designed to supply heat to the exhaust gas aftertreatment device, and a controller storing instructions in non-transitory memory executable to: supply energy to the electric machine to operate the turbocharger, and supply energy to the heater to heat the exhaust gas aftertreatment device, energy supplied to the heater based on the energy supplied to the electric machine. In this way, by concurrently providing power to the electric turbocharger and the catalyst heater, catalyst heating may be expedited, emissions quality may be maintained, and a desired boost pressure may be provided.

The motor vehicle according to the disclosure includes an internal combustion engine, a supply air system, an exhaust system, an exhaust gas aftertreatment device (also referred herein as exhaust catalyst) arranged in the exhaust system, and a turbine of a turbocharger arranged in the exhaust system upstream of the exhaust gas aftertreatment device or a compressor arranged in the supply air system comprises, according to the invention, both an electric machine which is designed in order to drive the turbine or the compressor, and a heater which is designed to supply heat to the exhaust gas aftertreatment device.

By way of this, a motor vehicle is provided, which by means of the electric machine can both create an E-boost and also heat up the exhaust gas aftertreatment device. Accordingly it is made possible to offset a cooling of the exhaust gas aftertreatment device by the use of the electric machine. The exhaust gas aftertreatment device thereby achieves a faster light-off and an improved performance.

In an advantageous configuration of the motor vehicle according to the invention, a further exhaust gas aftertreatment device is arranged in the exhaust system downstream of the exhaust gas aftertreatment device.

Thus, the exhaust gas aftertreatment device is arranged upstream of the further exhaust gas aftertreatment device and is the first of the two which are subjected to the flow of exhaust gas. The exhaust gas heated in the exhaust gas aftertreatment device by the heater can also heat up the further exhaust gas aftertreatment device. In addition, an improved pre-cleaning can take place in the exhaust gas aftertreatment device.

In a further advantageous configuration of the motor vehicle according to the invention, the heater is operated electrically.

Thus it is made possible to quickly activate the heater. In addition, electric energy, which was generated with the motor vehicle by means of recuperation, in particular brake recuperation, can thus be used. To end, in a further configuration, the motor vehicle is designed for carrying out a recuperation, in particular a brake recuperation.

In a further advantageous configuration of the motor vehicle according to the disclosure, it comprises an exhaust gas recirculation system which is formed to conduct exhaust gas out of the exhaust system to a supply air system. Thus it is made possible to additionally perform an exhaust gas recirculation.

The operating method according to the disclosure for a motor vehicle having an internal combustion engine, a supply air system, an exhaust system, an exhaust gas aftertreatment device arranged in the exhaust system, and a turbine of a turbocharger arranged in the exhaust system upstream of the exhaust gas aftertreatment device or a compressor arranged in the supply air system, a heater for heating the exhaust gas aftertreatment device includes operating the heater in a heating mode in a first exercise for the exhaust gas aftertreatment device and operating the turbocharger in an E-boost mode, an electric machine is operated for driving the turbine or the compressor.

By way of the heating mode, the exhaust gas aftertreatment device is heated up so that the same can be brought into a temperature window (above light-off temperature) that is optimal for exhaust gas aftertreatment. In addition, a cooling of the exhaust gas aftertreatment device brought about by the E-boost operation is additionally offset by the heating mode. The power delivered to the heater for heating the exhaust gas aftertreatment device may be adjusted based on the operation of the turbocharger. As an example, if the turbocharger is operated at a higher speed to provide the desired boost and/or reduce NOx production, the exhaust air fuel ratio may increase (leaner than stoichiometric) and the power supplied to the heater may be increased to compensate for the cooling effect of the increased exhaust air flow.

In an advantageous configuration of the operating method according to the invention, the first exercise is carried out in particular when in an E-boost check it was determined that a charge pressure undershoots a defined value, and it was determined in a temperature check that the exhaust gas aftertreatment device undershoots a defined temperature. The defined value may be based on an engine torque demand, and the defined temperature may be based on a light-off temperature of the exhaust gas aftertreatment device.

In an advantageous configuration of the operating method according to the invention, no heating operation is performed in a second exercise and the E-boost operation is carried out. Because of this, unnecessary heating of the exhaust gas aftertreatment device is avoided and the motor vehicle operated more efficiently.

In an advantageous configuration of the operating method according to the invention, the second exercise is carried out in particular when in the E-boost check it was determined that the charge pressure undershoots the defined value, and in the temperature check it was determined that the exhaust gas aftertreatment device does not undershoot the defined temperature.

In an advantageous configuration of the operating method according to the invention, no heating operation is carried out in a third exercise and no E-boost operation is carried out.

Because of this, unnecessary heating of the exhaust gas aftertreatment device and an unnecessary increase of the charge pressure are avoided and the motor vehicle is operated more efficiently.

In an advantageous configuration of the operating method according to the invention, the third exercise is carried out in particular when in the E-boost check it was determined that the charge pressure does not undershoot the defined value.

In a further advantageous configuration of the operating method according to the invention, an exhaust gas recirculation is additionally carried out in the first, second or third exercise. A cooling down of the exhaust gas aftertreatment device brought about by the exhaust gas recirculation can also be additionally offset.

In this way, by simultaneously operating the electric turbocharger and the electric heater coupled to the exhaust gas aftertreatment device, NOx production may be reduced while attainment of light-off of the exhaust gas aftertreatment device may be expedited. The technical effect of adjusting power delivered to the catalyst heater based on the power delivered to the electric motor coupled to the turbine or compressor of the turbocharger is that the cooling effect caused due to enleanment of the exhaust gas may be negated without over heating the catalyst, and battery power may be conserved. Overall, synergistic operation of the electric turbocharger and the catalyst heater may improve engine operation and emissions quality.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
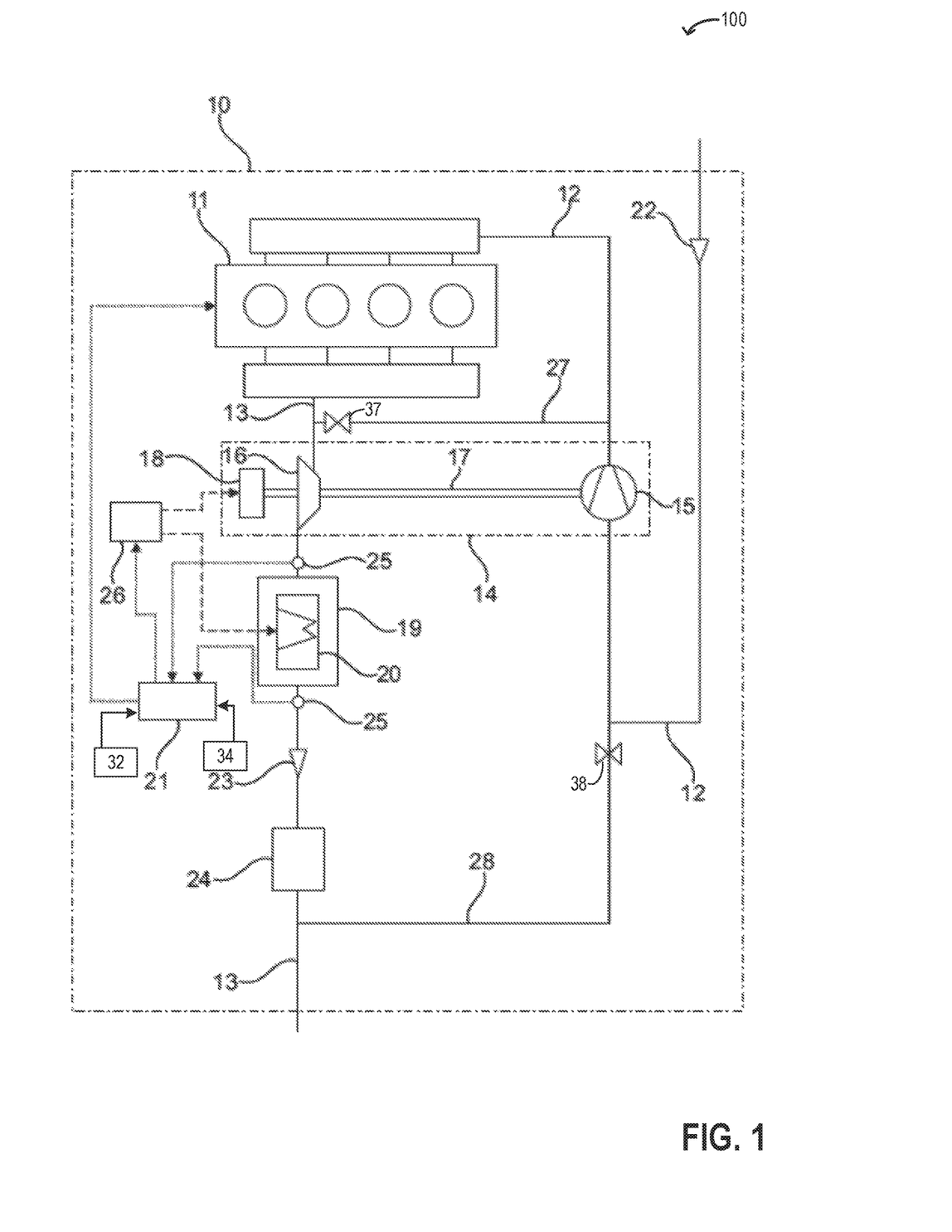
FIG. 1 shows a motor vehicle having an engine including an electrically heated catalyst (EHC) and an electric turbocharger in a first exemplary configuration
Figure 2:
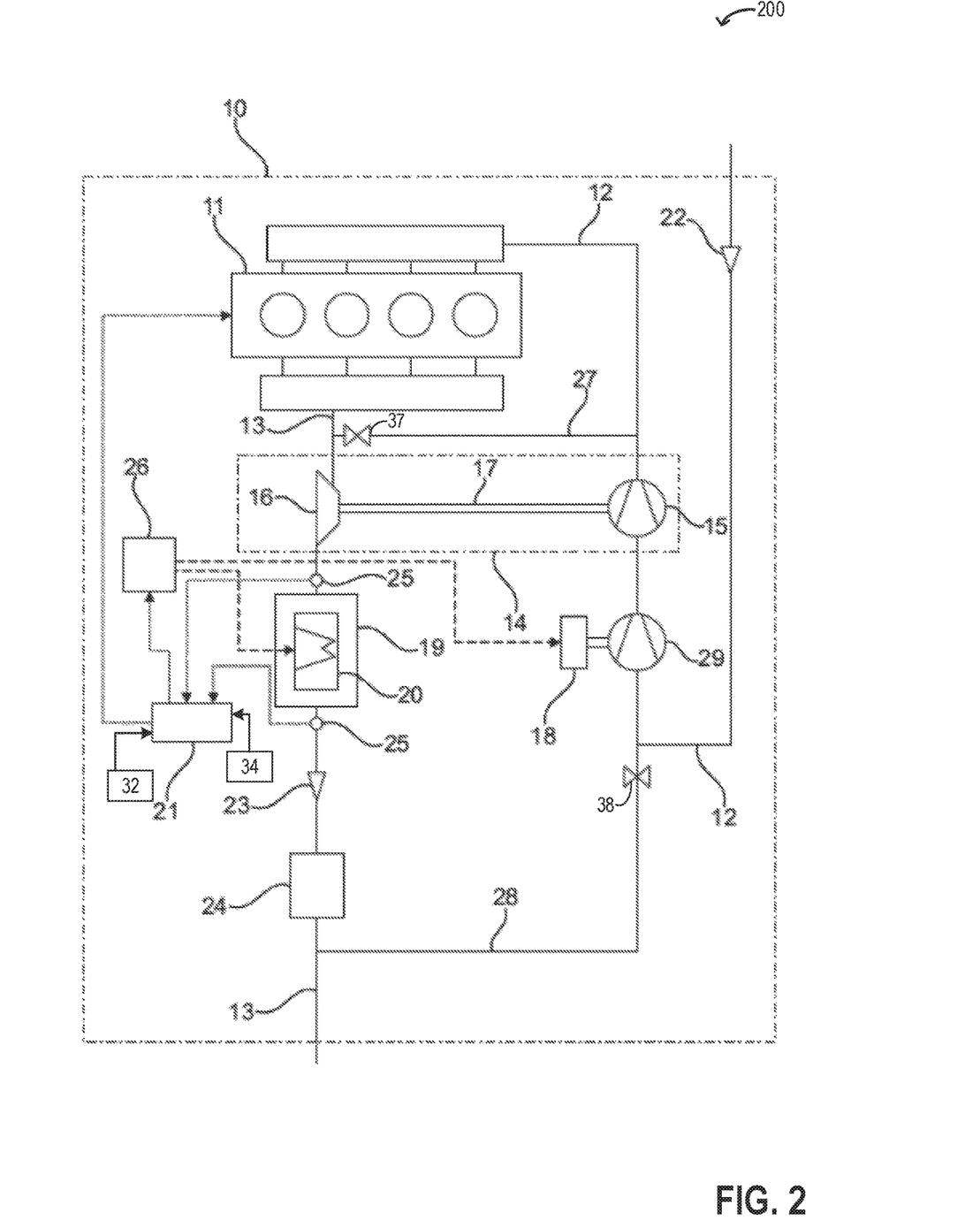
FIG. 2 shows the motor vehicle in a second exemplary configuration.
Figure 3:
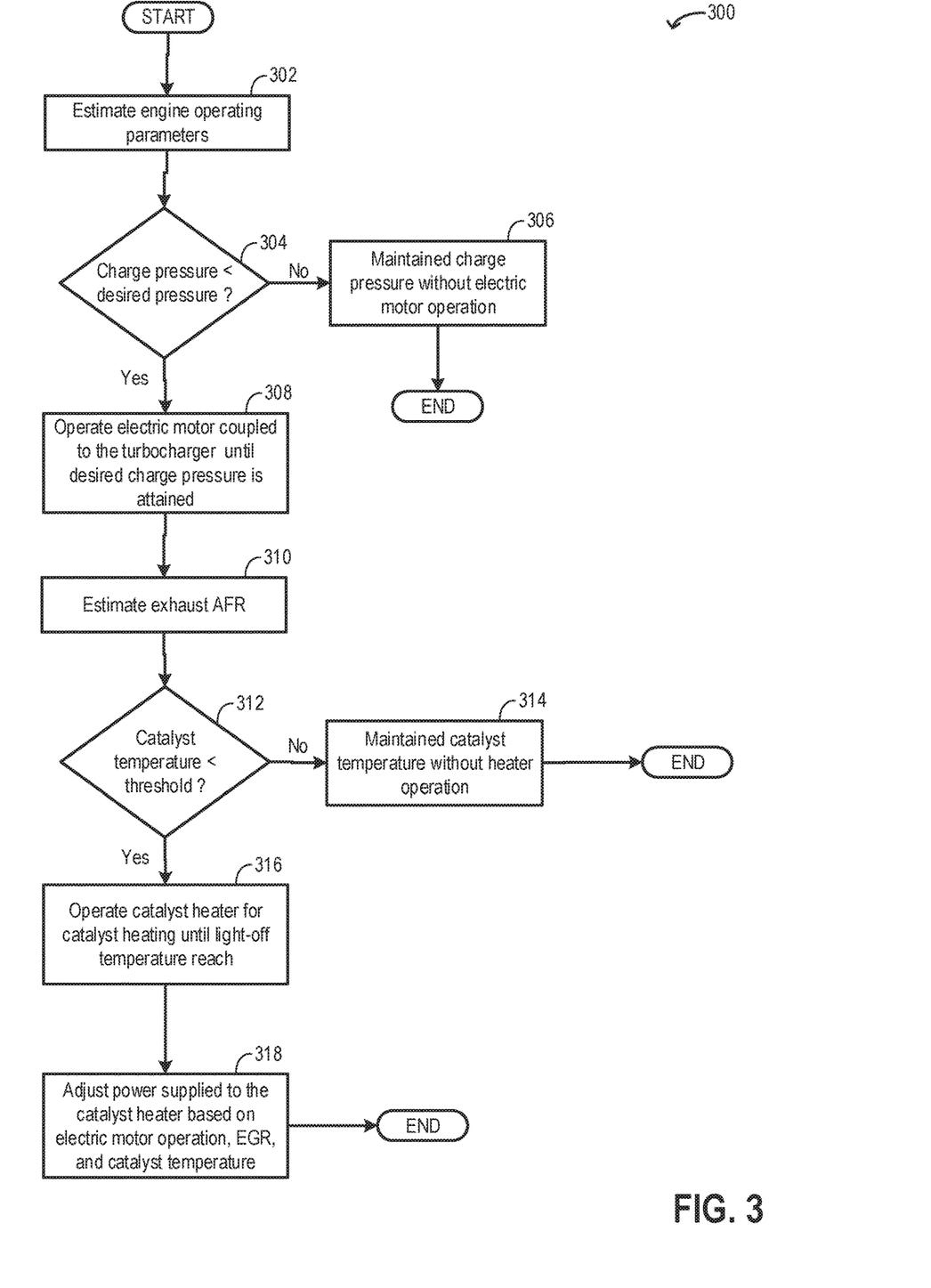
FIG. 3 shows a flow chart illustrating an example operating method that can be implemented to operate the EHC and electric turbocharger.
Figure 4:
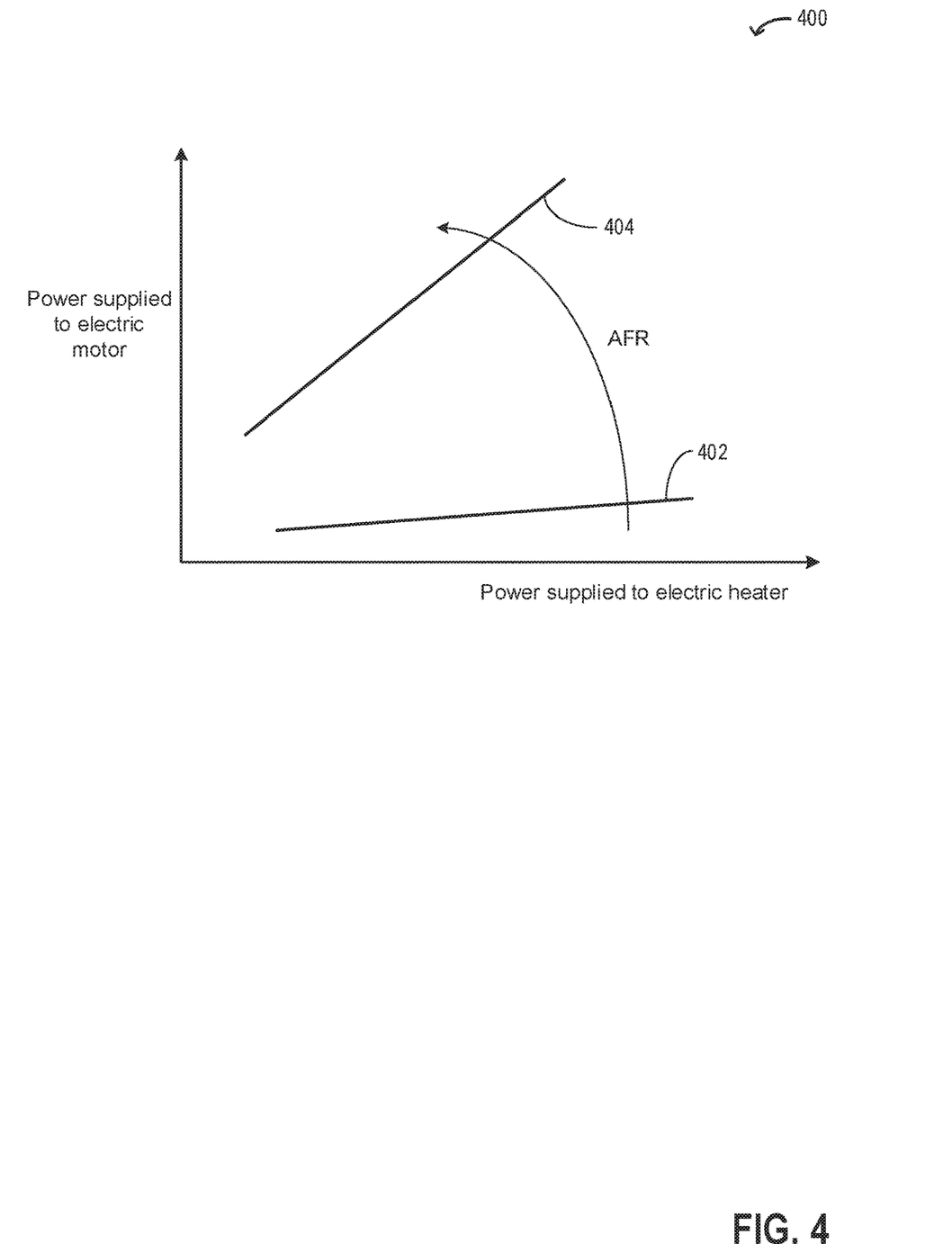
FIG. 4 is a plot showing relationship between power delivered to the electric motor and power delivered to EHC heater.
Figure 5:
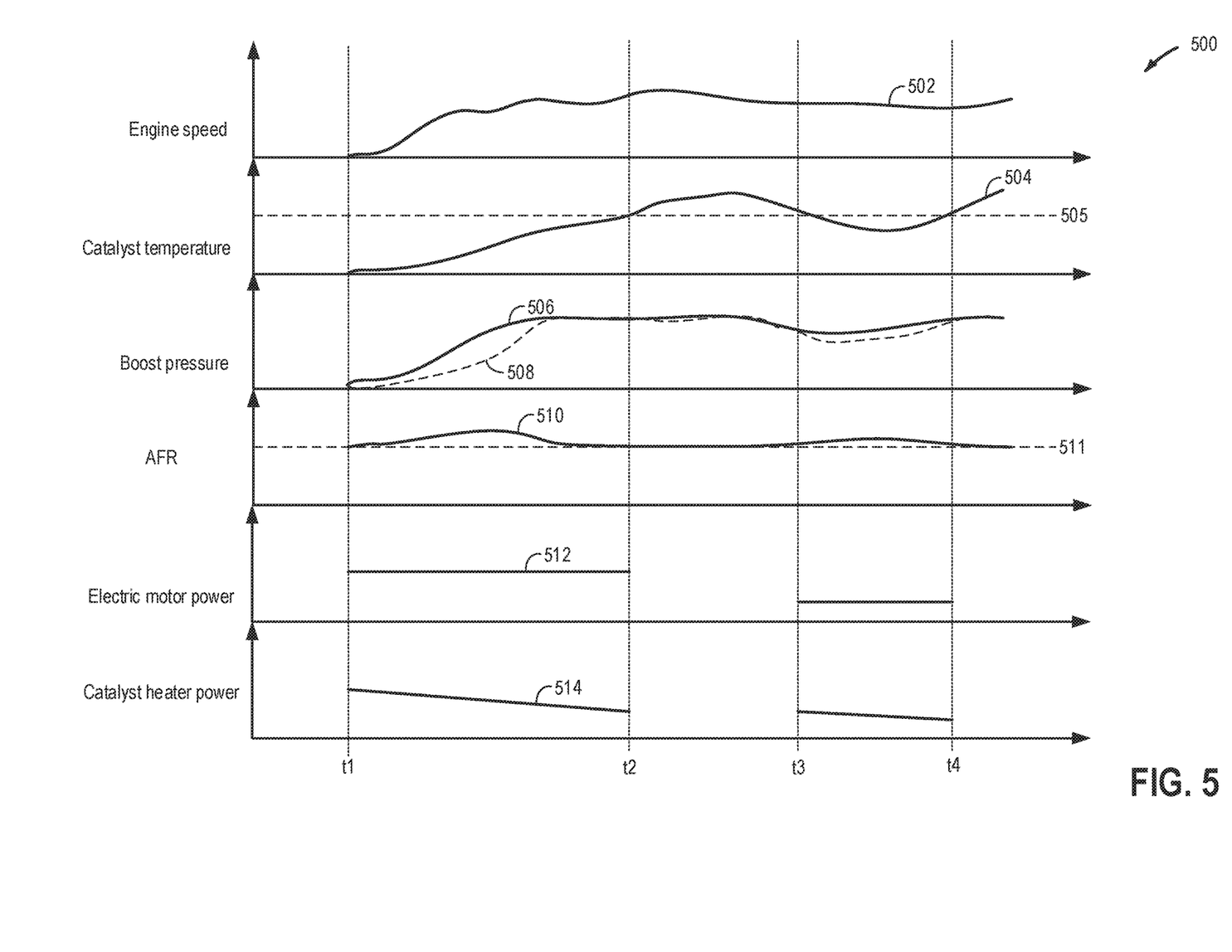
FIG. 5 shows an example operation of the electric turbocharger and the EHC heater.

The following description relates to systems and methods for operating an electric turbocharger and an electrically heated catalyst for expedited catalyst heating. As described with reference to an example engine system coupled to a motor vehicle system, as shown in FIGS. 1 and 2, operation of a heater for the catalyst may be adjusted based on operation of the electric turbocharger. An engine controller may be configured to perform a control routine, such as the example routine of FIG. 3, to adjust electric turbocharger operation and catalyst heater operation for reducing NOx emissions. FIG. 4 is a plot showing a relationship between powers delivered from an accumulator to each of the electric turbocharger and the catalyst heater. An example operation of each of the electric turbocharger and the catalyst heater is shown in FIG. 5.

In the FIGS. 1 and 2, the motor vehicle 10 according to the disclosure is schematically shown in each case in an exemplary configuration. The motor vehicle 10 comprises an internal combustion engine 11, which is operated with a fuel and supply air 22. In one example, the internal combustion engine may be a diesel engine and the fuel supplied may be diesel. For supplying the supply air 22, the motor vehicle 10 comprises a supply air system 12. During the operation of the internal combustion engine 11, an exhaust gas 23 is generated. For discharging the exhaust gas 23, the motor vehicle comprises an exhaust system 13.

In the exhaust system 13, a turbine 16 of an electric turbocharger 14 (also referred herein as e-booster) is arranged. The turbocharger 14 comprises, as is usual, in particular a turbocompressor 15 arranged in the supply air system 12 of the motor vehicle 10, which is torque-transmittingly connected to the turbine 16 with a shaft 17.

The motor vehicle 10 comprises an electric machine 18, which in a first configuration is designed for driving the turbine 16. The first configuration is shown in FIG. 1. In a second configuration, the motor vehicle 10 comprises an electric compressor 29 arranged in the supply air system 12 and the electric machine 18 here is designed to drive the electric compressor 29. The second configuration is shown in FIG. 2. Here, the electric machine 18 functions as electric motor in each case. In the second configuration, the supply air system 12 may comprise in particular a bypass about the electric compressor 29 that is not shown.

Furthermore, the motor vehicle 10 comprises a first exhaust gas aftertreatment device 19 (also referred herein as a catalyst) arranged in the exhaust system 13 downstream of the turbine 16. The first exhaust gas aftertreatment device 19 is in particular a pre-catalytic converter. The first exhaust gas aftertreatment device 19 is for example also a particulate filter. The first exhaust gas aftertreatment device 19 comprises a heater 20, which is designed for supplying heat to the first exhaust gas aftertreatment device 19. Here, the heater 20 is designed to heat the first exhaust gas aftertreatment device 19 up to a starting temperature (such as a light-off temperature), from which the first exhaust gas aftertreatment device 19 operates optimally. The heater 20 is in particular an electric heater. Downstream of the first exhaust gas aftertreatment device 19 a second exhaust gas aftertreatment device 24 is arranged in the exhaust system 13. The second exhaust gas aftertreatment device 24 may be a main catalytic converter. Heat supplied to the first exhaust gas aftertreatment device 19 may be transmitted to the second exhaust gas aftertreatment device 24 via the exhaust gas flow.

The motor vehicle 10 comprises in particular at least one exhaust gas recirculation system 27, 28 which is designed in order to carry out an exhaust gas recirculation. The at least one exhaust gas recirculation system 27, 28 is designed to conduct exhaust gas 23 out of the exhaust system 13 into the supply air system 12. Accordingly, the motor vehicle 10 comprises in particular a high-pressure exhaust gas recirculation system 27 and/or a low-pressure exhaust gas recirculation system 28. The high-pressure exhaust gas recirculation system (HP-EGR) 27, including a first HP-EGR valve 37, branches off from the exhaust system 13 upstream of the turbine 16 and leads to the supply air system 12. There, the high-pressure exhaust gas recirculation system 27 opens downstream of the turbocompressor 15. The low-pressure exhaust gas recirculation system (LP-EGR) 28, including a first LP-EGR valve 38, branches off from the exhaust system 13 in particular downstream of each of the first exhaust gas aftertreatment device 19 and the second exhaust gas aftertreatment device 24 and leads to the supply air system 12. There, the low-pressure exhaust gas recirculation system 28 opens upstream of each of the turbocompressor 15 and the electric compressor 29.

For detecting the temperature of the first exhaust gas aftertreatment device 19, the motor vehicle 10 comprises in particular at least one temperature sensor 25. In the FIG. 1, two temperature sensors are exemplarily arranged, one sensor 25 upstream and one sensor 25 downstream of the exhaust gas aftertreatment device 19.

For supplying the electric machine 18 with electric energy, the motor vehicle 10 comprises in particular an accumulator 26. The accumulator 26 is part of an electrical system or part electrical system of the motor vehicle 10. The motor vehicle 10 is designed in particular to supply the accumulator 26 with electric energy which was created by means of recuperation. In particular, the motor vehicle 10 is designed to carry out a brake recuperation (regenerative braking) wherein when a brake pedal is depressed, kinetic energy from the vehicle is converted to electrical energy and stored in the accumulator 26 and the vehicle speed is reduced (or vehicle stopped).

For controlling at least a part operation of the motor vehicle 10, it comprises a control unit 21 (also referred herein as electronic control unit ECU) including a controller. ECU 21 is shown receiving information from a plurality of sensors 32 (various examples of which are described herein) and sending control signals to a plurality of actuators 34 (various examples of which are described herein). The controller may receive input data from the various sensors, process the input data, and trigger various actuators in response to the processed input data based on instruction or code programmed therein corresponding to one or more routines. As an example, the controller may estimate temperature of the first exhaust gas aftertreatment device 19 based on inputs from temperature sensors 25, 26 and in response to a lower than threshold catalyst temperature, the controller may send a signal to the accumulator 26 to supply current to the electric heater 20 which is then actuated to supply heat to the first exhaust gas aftertreatment device 19.

The electric turbocharger 14 and the electric heater 20 coupled to the first exhaust gas aftertreatment device 19 may be operated in three exercises. According to the disclosure, the heater 20 for heating up the exhaust gas aftertreatment device 19 is operated in a first exercise in a heating mode and thus heat energy is supplied to the exhaust gas aftertreatment device 19. In addition, the electric machine 18 is operated in an E-boost mode and the turbine 16 or the compressor thus driven. Driving the turbine 16 causes the turbocompressor 15 to be driven and thus an increase of the charge pressure. Driving the compressor 29 likewise causes an increase of the charge pressure. Here, the heating operation can be carried out prior to the E-boost operation or simultaneously with the E-boost operation, or after the E-boost operation. The first exercise is carried out in particular subject to the prerequisite that the charge pressure undershoots a defined value and that the exhaust gas aftertreatment device 19 undershoots a defined temperature, in particular the starting temperature. The current value of the charge pressure is compared to the defined value for this purpose in an E-boost check and the current temperature of the exhaust gas aftertreatment device 19 is compared to the defined temperature in a temperature check.

In a second exercise, no heating operation is carried out, but the E-boost operation is carried out. The second exercise is carried out in particular subject to the prerequisite that it was determined in the E-boost check that the charge pressure undershoots the defined value and it was determined in the temperature check that the exhaust gas aftertreatment device 19 does not undershoot the defined temperature.

In a third exercise, no heating operation is carried out and no E-boost operation is carried out. The third exercise is carried out in particular subject to the prerequisite that in the E-boost check it was determined that the charge pressure does not undershoot the defined value.

An exhaust gas recirculation can be carried out in addition to the heating operation and/or to the E-boost operation, in the case of which exhaust gas 23 is conducted from the exhaust system 13 to the supply air system 12. In the case of the E-boost operation driving the turbine 16, the exhaust gas 23 may be conducted through the low-pressure exhaust gas recirculation system 28. In the case of the E-boost operation driving the compressor 29, the exhaust gas 23 may also be conducted through the low-pressure exhaust gas recirculation system 28.

In this way, in response to a lower than threshold temperature of an exhaust catalyst while an electric turbocharger is being operated, the catalyst may be heated via an electric heater coupled to the catalyst, a power supplied to the electric heater adjusted based on a speed of the electric turbocharger. The power supplied may be increased with an increase in electric turbocharger speed, the electric turbocharger driven by an electric machine coupled to one of an exhaust turbine, an electric intake compressor, and a shaft connecting the exhaust turbine to an intake compressor. The electric turbocharger may be operated in response to the lower than threshold temperature of the exhaust catalyst to increase exhaust air fuel ratio, the threshold temperature based on a light-off temperature of the catalyst and the electric heater may be operated to increase and then maintain a temperature of the catalyst above the light-off temperature Although the disclosure was illustrated and described in more detail by the preferred exemplary embodiment, the invention is not restricted by the disclosed examples and other variations can be derived from this by the person skilled in the art without leaving the scope of protection of the invention.

The figures are not necessarily true to detail and to scale and can be shown enlarged or reduced in size in order to offer a better overview. For this reason, functional details disclosed here should not be understood as being restrictive but merely as illustrative basis which offers the person skilled in the art in this field of technology guidance in order to employ the present invention in manifold ways.

The expression "and/or" used here when utilized in a series of two or more elements is to mean that each of the mentioned elements can be used alone or any combination of two or more of the mentioned elements can be used. If for example a composition is described including the components A, B and/or C, the composition can include A alone; B alone; C alone; A and B combined; A and C combined; B and C combined or A, B and C combined. FIG. 3 shows an example method 300 that can be implemented to adjust electric turbocharger operation and catalyst heater operation for reducing NOx emissions. Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, current vehicle and engine operating parameters may be determined. The parameters may include vehicle speed, torque demand, engine speed, engine temperature, etc. The controller may estimate a current charge pressure based on input from a manifold air pressure sensor and a desired charge pressure based on torque demand. Also, the controller may estimate temperature of an electrically heated exhaust catalyst (such as first exhaust gas aftertreatment device 19 in FIG. 1) based on temperature sensors coupled to the exhaust passage upstream and/or downstream of the EHC. Ambient conditions including ambient temperature and pressure may also be estimated.

At 304, the routine includes determining if the current charge pressure is lower than the desired charge pressure. If the current charge pressure is lower than the desired charge pressure, engine torque output may not satisfy the torque demand, thereby adversely affecting engine performance. If it is determined that the current charge pressure is not lower than the desired charge pressure, at 306, the current charge pressure may be maintained without operation of an electric motor coupled to the electric turbocharger. The electric motor, powered by an alternator, may be coupled to an exhaust turbine, an intake electric compressor, or a shaft coupling the exhaust turbine to an intake compressor. The charge pressure may be maintained by adjusting opening of an intake throttle based on torque demand.

If it is determined that the current charge pressure is lower than the desired charge pressure, at 308, the electric motor (such as electric machine 18 in FIGS. 1 and 2) coupled to the exhaust turbine or the electric compressor may be operated to provide boost. Operation of the electric turbocharger may be continued until the desired charge pressure is attained and then the electric motor may be deactivated. The electric motor powered by the alternator may be at least partly charged by regenerative braking.

During operation of the electric turbocharger, excess (uncombusted) air may flow through the engine cylinders and the exhaust passage, and the engine may operate at a leaner than stoichiometric air fuel ratio (AFR). At higher AFR 9 above a threshold AFR), there may be reduction in an amount of NOx produced during combustion. During operation, a portion of the exhaust gas may be recirculation (EGR) to the intake passage based on engine dilution demands. By increasing EGR, tailpipe NOx emissions may be decreased, however, EGR may have a cooling effect on the EHC.

At 310, the exhaust AFR may be estimated via an oxygen sensor coupled to the exhaust passage upstream of the EHC. An increase in AFR may cause cooling of the EHC due to the cooler air (relative to the hot exhaust gas) flowing through the EHC along with the exhaust gas. Therefore, even as leaner than stoichiometric operation of the engine decreases NOx production, the cooler air in the exhaust passage may reduce catalyst temperature below the catalyst light-off temperature. Below the light-off temperature, the catalyst may not be effective in treatment of NOx and other combustion by products in the exhaust gas.

At 312, the routine includes determining if the catalyst temperature is lower than a threshold temperature. The threshold temperature may be based on the light-off temperature of the EHC. In one example, the EHC temperature may be lower than the threshold temperature during a cold-start. In another example, the EHC temperature may reduce below the light-off temperature due to operation of the electric turbocharger causing air cooling of the exhaust reaching the EHC. In yet another example, the EHC temperature may reduce below the light-off temperature due to increased EGR flow.

If it is determined that the catalyst temperature is not below the threshold temperature, at 314, the catalyst temperature may be maintained above the threshold temperature without operation of the heater. If it is determined that the catalyst temperature is lower than the threshold, it may be inferred that catalyst heating may be desired to increase the catalyst temperature to above the light-off temperature and maintain its conversion capability. At 316, the heater coupled to the catalyst is operated to provide heat to the catalyst. The controller may send a signal to the alternator (also powering the electric motor of the electric turbocharger) to deliver power to the electric heater for expedited catalyst warm-up.

In one example, such as during a cold-start, even if additional boost pressure is not desired, the electric turbocharger may be operated to enlean the exhaust AFR until the catalyst attains light-off temperature. By running the engine leaner than stoichiometric, production of NOx may be reduced until the catalyst is capable of conversion.

At 318, a power supplied to the catalyst heater may be adjusted based on the electric motor operation, EGR flow-rate, and catalyst temperature. As the speed of the electric turbocharger increases (proportional to the power delivered to the electric motor), there may be a corresponding increase in exhaust AFR and a decrease in exhaust temperature. Therefore, in order to mitigate the cooling effect of cooler exhaust gas on the exhaust catalyst, the power supplied to the catalyst heater may be directly proportional to the speed of the electric turbocharger, the power supplied increasing with the increase in electric motor speed. As the EGR flow-rate increases, there may be a corresponding increase in exhaust AFR and a decrease in exhaust temperature. Similarly, to offset the effect of the cooler exhaust gas on the catalyst, the power supplied to the catalyst heater may be directly proportional to the EGR flow-rate, the power supplied increasing with the increase in EGR flow-rate. The power supplied to the catalyst heater may be inversely proportional to the catalyst temperature such as the power supplied may be decreased with the increase in catalyst temperature.

In one example, the controller may use a look-up table to determine the power delivered from the alternator to the exhaust catalyst heater with the input being each of the electric motor (coupled to the turbocharger) speed, EGR flow-rate, and catalyst temperature as inputs and catalyst heater power as output. The power supplied to the catalyst electric heater may be adjusted over time based on each of the electric motor speed, EGR flow-rate, and catalyst temperature, and the heating may be discontinued once the catalyst temperature increases to above the threshold. In this way, by constantly adjusting the power supplied to the catalyst heater, cooling effect caused due to increased exhaust AFR may be mitigated and overheating of the catalyst may be avoided.

In this way, during a first condition, each of an electric turbocharger and an electric heater coupled to an exhaust catalyst may be operated by supplying power from a battery, a first power supplied to the electric heater being a function of a second power supplied to the electric turbocharger, and during a second condition, the electric turbocharger may be operated by supplying power from the battery while maintaining the electric heater inactive. The first condition may include a temperature of the catalyst being lower than a catalyst light-off temperature and the second condition may include the temperature of the catalyst being higher than the catalyst light-off temperature.

FIG. 4 shows an example plot 400 of a relationship between a power supplied to an electric motor (such as electric machine 18 in FIGS. 1-2) driving the electric turbocharger (exhaust turbine or electric compressor) and a power supplied to an electric heater (such as heater 20 in FIGS. 1-2) of an electrically heated catalyst for a constant torque output.

The x-axis shows the power supplied to the heater while the y-axis shows the power supplied to the electric motor. Line 402 shows a variation in power supplied to the heater corresponding to the power supplied to the electric motor at a first exhaust air fuel ratio (AFR). Line 404 shows a variation in power supplied to the heater corresponding to the power supplied to the electric motor at a second exhaust AFR, the second AFR higher than the first AFR. As seen from the plot, for a constant AFR, the power supplied to the heater increases with an increase in the power supplied to the electric motor. FIG. 4 represents look-up table data that may be stored in the controller and used during real time control as described the routines herein. In particular, the figure illustrates how, as the AFR changes, the relationship used to control power to the motor and to the electric heater is adjusted (in this particular example by changing a slope, but other adjustments may also be used such as changing from a linear relationship to a quadratic relationship, moving offsets, etc.).

FIG. 5 shows an example timeline 500 illustrating synchronous operation of an electric turbocharger and an electric heater coupled to an exhaust catalyst. The horizontal (x-axis) denotes time and the vertical markers t1-t4 identify significant times in the routine for electric turbocharger and electric heater operation.

The first plot, line 502, shows a variation in engine speed as estimated via a crankshaft position sensor. The second plot, line 504, shows catalyst temperature as estimated based on one or more exhaust temperature sensors coupled to the exhaust passage upstream and/or downstream of the catalyst. Dashed line 505 denotes a light-off temperature of the catalyst below which the catalyst may not effectively reduce tailpipe emissions. The third plot, dashed line 508 denotes an actual boost pressure while line 506 denotes a desired boost pressure as estimated based on a torque demand and charge pressure. The fourth plot, line 510 denotes an exhaust air fuel ratio (AFR) as estimated via an exhaust oxygen sensor. Dashed line 511 denotes a stoichiometric AFR. The fifth plot, line 512, shows a magnitude of power delivered from an alternator to the electric motor driving the electric turbocharger. The sixth plot, line 514, shows a magnitude of power delivered from the alternator to the electric heater supplying heat to the exhaust catalyst.

Prior to time t1, combustion is not carried out and the engine is not operated to propel the vehicle. The electric turbocharger and the electric heater coupled to the catalyst are maintained inactive. At time t1, the engine is started from rest and the engine speed increases gradually. The actual boost pressure is lower than the desired boost pressure, thereby prompting operation of the electric turbocharger to increase boost pressure to the desired boost pressure. Power is supplied from the alternator to the electric motor driving the turbocharger to increase turbocharger speed. The power supplied to the electric machine is directly proportional to the difference between the desired boost pressure and the actual boost pressure. Due to the increased turbocharger speed, the actual boost pressure increases but the exhaust AFR changes from stoichiometric to leaner than stoichiometric (higher AFR).

The catalyst temperature is below the threshold temperature 505 and an increase in AFR causes a cooler exhaust gas to reach the catalyst, thereby prolonging catalyst heating. Therefore, at time t1, the electric heater coupled to the catalyst is activated and power is supplied from the alternator to the electric heater for actively heating the catalyst. The power supplied to the electric heater is estimated by the controller based on the exhaust AFR and the catalyst temperature. Between time t1 and t2, as the catalyst temperature increases, the power supplied to the electric heater is decreased to reduce the possibility of over-heating.

At time t2, the catalyst temperature increases to the threshold temperature 505 and since further heating of the catalyst is not requested, the electric heater is deactivated. Also, at time t2, the actual boost pressure is equal to the desired boost pressure and the electric turbocharger is no longer powered by the accumulator.

Between time t2 and t3, the engine operates at stoichiometric AFR with the catalyst temperature being functional in treatment of exhaust gas flowing through it. At time t3, the actual boost pressure falls short of the desired boost pressure and the electric motor is activated to supplement the boost pressure and increase it to the desired level. Due to the operation of the electric turbocharger, the exhaust AFR increases causing cooler air to flow through the exhaust turbine. The flow of cooler air causes the catalyst temperature to decrease below the threshold 505.

In order to maintain catalyst functionality, between time t3 and t4, power is supplied to the electric heater coupled to the catalyst. The electric heater ensures that the catalyst temperature is increased and maintained at or above the threshold temperature. The power supplied to the electric heater is estimated by the controller based on the exhaust AFR and the changing catalyst temperature. Between time t3 and t4, as the catalyst temperature increases, the power supplied to the electric heater is decreased to provide catalyst heating without overshooting the temperature. Since the difference between the catalyst temperature and the threshold temperature 505 is lower between time t3 and t4 relative to the difference (between the catalyst temperature and the threshold temperature 505) between time t1 and t2, the power supplied to the catalyst heater between time t3 and t4 may be lower than the power supplied to the same heater between time t1 and t2 (during cold-start).

At time t4, in response to the actual boost pressure being equal to the desired boost pressure and the catalyst temperature increasing to the threshold temperature, power may no longer be supplied to each of the electric machine and the catalyst electric heater. After time t4, the engine may be operated at stoichiometric AFR without assist from the electric turbocharger.

In this way, by adjusting power delivered to the heater of an exhaust catalyst based on a cooling effect of increased exhaust AFR during electric turbocharger operation, catalyst heating may be expedited without the possibility of overheating. The technical effect of operating the electric turbocharger during cold-start conditions is that along with supply of boost pressure, decreased engine AFR may reduce NOx production until the catalyst has attained its light-off temperature and is completely functional. Overall, simultaneous operation of the electric turbocharger and the catalyst heater may improve both engine operation and emissions quality.

An example system for a motor vehicle comprising: an internal combustion engine, a supply air system, an exhaust system, an exhaust gas aftertreatment device arranged in the exhaust system, a turbocharger including a turbine arranged in the exhaust system upstream of the exhaust gas aftertreatment device and a compressor arranged in the supply air system, an electric machine designed to drive the turbine or the compressor, and a heater designed to supply heat to the exhaust gas aftertreatment device, and a controller storing instructions in non-transitory memory executable to: supply energy to the electric machine to operate the turbocharger; and supply energy to the heater to heat the exhaust gas aftertreatment device, energy supplied to the heater based on the energy supplied to the electric machine. In any preceding example, additionally or optionally, the heater is electrically operated, and the energy supplied to the heater is directly proportional to the energy supplied to the electric machine. In any or all of the preceding examples, the method further comprising, additionally or optionally, an exhaust gas recirculation system which is designed to conduct an amount of exhaust gas out of the exhaust system to the supply air system, the energy supplied to the heater further based on the amount of exhaust gas recirculated to the supply air system. In any or all of the preceding examples, additionally or optionally, each of the turbocharger and the heater are operated when in an E-boost check it was determined that a charge pressure undershoots a defined value, and in a temperature check it was determined that the exhaust gas aftertreatment device undershoots a defined temperature. In any or all of the preceding examples, additionally or optionally, the electric machine is deactivated in response to the charge pressure being higher than the defined value and wherein the heater is deactivated in response to exhaust gas aftertreatment device light-off. In any or all of the preceding examples, additionally or optionally, the defined value is based on an engine torque demand, and wherein the defined temperature is based on a light-off temperature of the exhaust gas aftertreatment device.

Another example method for an engine comprises: in response to a lower than threshold temperature of an exhaust catalyst while an electric turbocharger is being operated, heating the catalyst via an electric heater coupled to the catalyst, a power supplied to the electric heater adjusted based on a speed of the electric turbocharger. In any preceding examples, additionally or optionally, the power supplied is increased with an increase in electric turbocharger speed, the electric turbocharger driven by an electric machine coupled to one of an exhaust turbine, an electric intake compressor, and a shaft connecting the exhaust turbine to an intake compressor. In any or all of the preceding examples, additionally or optionally, each of the electric turbocharger and the electric heater are powered by a common alternator. In any or all of the preceding examples, additionally or optionally, the power supplied is further adjusted based on a temperature of the exhaust catalyst, the power decreased with an increase in the temperature of the catalyst. In any or all of the preceding examples, additionally or optionally, the power supplied is further adjusted based on a flow of exhaust gas recirculation (EGR) from an engine exhaust to an engine intake, the power increased with an increase in EGR flow. In any or all of the preceding examples, additionally or optionally, the electric turbocharger is operated in response to an actual charge pressure being lower than a target charge pressure, the target charge pressure based on an operator torque demand. In any or all of the preceding examples, additionally or optionally, the electric turbocharger is operated in response to the lower than threshold temperature of the exhaust catalyst to increase exhaust air fuel ratio, the threshold temperature based on a light-off temperature of the catalyst. In any or all of the preceding examples, additionally or optionally, the electric heater is operated to increase and then maintain a temperature of the catalyst above the light-off temperature.

In yet another example, a method for an engine comprises: during a first condition, operating each of an electric turbocharger and an electric heater coupled to an exhaust catalyst by supplying power from a battery, a first power supplied to the electric heater being a function of a second power supplied to the electric turbocharger, and during a second condition, operating the electric turbocharger by supplying power from the battery while maintaining the electric heater inactive. In any preceding examples, additionally or optionally, the first condition includes a temperature of the catalyst being lower than a catalyst light-off temperature and the second condition includes the temperature of the catalyst being higher than the catalyst light-off temperature. In any or all of the preceding examples, additionally or optionally, the first condition includes a cold-start when the electric turbocharger is operated to reduce an exhaust air fuel ratio to below a threshold. In any or all of the preceding examples, additionally or optionally, the engine is coupled inside a hybrid vehicle, and wherein the battery is charged by regenerative braking. In any or all of the preceding examples, additionally or optionally, the electric turbocharger includes an electric motor coupled to an exhaust turbine or an electric compressor, the electric motor capable of rotating the exhaust turbine or the electric compressor. In any or all of the preceding examples, additionally or optionally, the second power increases with one or more of an increase in the first power and a decrease in the temperature of the catalyst.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a motor vehicle comprising: an internal combustion engine, a supply air system, an exhaust system, an exhaust gas aftertreatment device arranged in the exhaust system, a turbocharger including a turbine arranged in the exhaust system upstream of the exhaust gas aftertreatment device and a compressor arranged in the supply air system, an electric machine designed to drive the turbine or the compressor, and a heater designed to supply heat to the exhaust gas aftertreatment device; and a controller storing instructions in non-transitory memory executable to: supply energy to the electric machine to operate the turbocharger; and supply energy to the heater to heat the exhaust gas aftertreatment device, energy supplied to the heater based on the energy supplied to the electric machine; wherein the heater is electrically operated, and the energy supplied to the heater is directly proportionally increased with an increase of the energy supplied to the electric machine.

2. The system of claim 1, further comprising: an exhaust gas recirculation system which is designed to conduct an amount of exhaust gas out of the exhaust system to the supply air system, the energy supplied to the heater further based on the amount of exhaust gas recirculated to the supply air system.

3. The system of claim 1, wherein each of the turbocharger and the heater are operated when in an E-boost check it is determined that a charge pressure undershoots a defined value, and in a temperature check it is determined that the exhaust gas aftertreatment device undershoots a defined temperature.

4. The system of claim 3, wherein the electric machine is deactivated in response to the charge pressure being higher than the defined value and wherein the heater is deactivated in response to exhaust gas aftertreatment device light-off.

5. The system of claim 3, wherein the defined value is based on an engine torque demand, and wherein the defined temperature is based on a light-off temperature of the exhaust gas aftertreatment device.

6. A method for an engine, comprising: in response to a lower than threshold temperature of an exhaust catalyst while an electric turbocharger is being operated, heating the catalyst via an electric heater coupled to the catalyst, a power supplied to the electric heater adjusted based on a speed of the electric turbocharger; wherein the power supplied is directly proportionally increased with an increase in the energy supplied to the electric turbocharger, the electric turbocharger driven by an electric machine coupled to one of an exhaust turbine, an electric intake compressor, and a shaft connecting the exhaust turbine to an intake compressor.

7. The method of claim 6, wherein each of the electric turbocharger and the electric heater are powered by a common alternator.

8. The method of claim 6, wherein the power supplied is further adjusted based on a temperature of the exhaust catalyst, the power decreased with an increase in the temperature of the catalyst.

9. The method of claim 6, wherein the power supplied is further adjusted based on a flow of exhaust gas recirculation (EGR) from an engine exhaust to an engine intake, the power increased with an increase in EGR flow.

10. The method of claim 6, wherein the electric turbocharger is operated in response to an actual charge pressure being lower than a target charge pressure, the target charge pressure based on an operator torque demand.

11. The method of claim 6, wherein the electric turbocharger is operated in response to the lower than threshold temperature of the exhaust catalyst to increase exhaust air fuel ratio, the threshold temperature based on a light-off temperature of the catalyst.

12. The method of claim 6, wherein the electric heater is operated to increase a temperature of the catalyst and then maintain the temperature of the catalyst above the light-off temperature.

13. A method for an engine, comprising: during a first condition, operating each of an electric turbocharger and an electric heater coupled to an exhaust catalyst by supplying power from a battery, a first power supplied to the electric heater being a function of a second power supplied to the electric turbocharger; and during a second condition, operating the electric turbocharger by supplying power from the battery while maintaining the electric heater inactive; wherein the first condition includes where the power supplied is directly proportionally increased with an increase in the energy supplied to the electric turbocharger, the electric turbocharger driven by an electric machine coupled to one of an exhaust turbine, an electric intake compressor, and a shaft connecting the exhaust turbine to an intake compressor.

14. The method of claim 13, wherein the first condition includes a temperature of the catalyst being lower than a catalyst light-off temperature and the second condition includes the temperature of the catalyst being higher than the catalyst light-off temperature.

15. The method of claim 13, wherein the first condition includes a cold-start when the electric turbocharger is operated to reduce an exhaust air fuel ratio to below a threshold.

16. The method of claim 13, wherein the engine is coupled inside a hybrid vehicle, and wherein the battery is charged by regenerative braking.

17. The method of claim 13, wherein the electric turbocharger includes an electric motor coupled to an exhaust turbine or an electric compressor, the electric motor capable of rotating the exhaust turbine or the electric compressor.

18. The method of claim 13, wherein the second power increases with one or more of an increase in the first power and a decrease in the temperature of the catalyst.

* * * * *